(12) United States Patent
Freeman et al.

(10) Patent No.: US 8,931,144 B2
(45) Date of Patent: Jan. 13, 2015

(54) TETHERING SYSTEM AND METHOD FOR REMOTE DEVICE

(71) Applicant: State Farm Mutual Automobile Insurance Company, Bloomington, IL (US)

(72) Inventors: James M. Freeman, Normal, IL (US); Roger D. Schmidgall, Normal, IL (US); Brian N. Harvey, Bloomington, IL (US); Nathan Lee Tofte, Downs, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 13/804,984

(22) Filed: Mar. 14, 2013

(65) Prior Publication Data
US 2014/0259549 A1 Sep. 18, 2014

(51) Int. Cl.
*F16G 11/12* (2006.01)

(52) U.S. Cl.
CPC .................................... *F16G 11/12* (2013.01)
USPC ................................................. 24/298; 24/1

(58) Field of Classification Search
USPC ............. 24/298, 1; 182/45; 248/176.1, 187.1, 248/498, 680, 690
See application file for complete search history.

(56) References Cited

U.S. PATENT DOCUMENTS

| | | | | |
|---|---|---|---|---|
| 3,170,206 A * | 2/1965 | Triplett | ............................ | 24/298 |
| 3,767,152 A * | 10/1973 | Killinger | ................... | 248/231.81 |
| 3,883,926 A * | 5/1975 | Reynolds | ...................... | 248/74.1 |
| 5,035,558 A * | 7/1991 | Prosen | ............................ | 410/96 |
| 5,076,079 A * | 12/1991 | Monoson et al. | .................. | 70/58 |
| 5,207,171 A * | 5/1993 | Westwood, III | ............... | 114/218 |
| 5,730,246 A * | 3/1998 | Beard | .............................. | 182/45 |
| 5,875,867 A * | 3/1999 | Beard | .............................. | 182/45 |
| 5,913,479 A * | 6/1999 | Westwood, III | ............... | 24/298 |
| 5,975,499 A * | 11/1999 | Ostrobrod | ...................... | 254/332 |
| 6,112,853 A * | 9/2000 | Beard | .............................. | 182/45 |
| 7,458,238 B2 * | 12/2008 | Stolk et al. | ........................ | 70/18 |
| 7,523,910 B2 * | 4/2009 | Moran | ........................... | 248/317 |
| 8,025,125 B2 * | 9/2011 | Vetesnik et al. | ................ | 182/45 |
| 2006/0289233 A1 * | 12/2006 | Flaherty | .......................... | 182/45 |
| 2009/0265193 A1 | 10/2009 | Collins et al. | | |
| 2011/0006174 A1 * | 1/2011 | Hollinger | .................... | 248/176.1 |

OTHER PUBLICATIONS

U.S. Appl. No. 13/647,098, filed Oct. 8, 2012.
U.S. Appl. No. 13/836,695, filed Mar. 15, 2013.
U.S. Appl. No. 13/839,634, filed Mar. 15, 2013.
U.S. Appl. No. 13/893,904, filed May 14, 2013.

* cited by examiner

*Primary Examiner* — Robert J Sandy
*Assistant Examiner* — Louis Mercado
(74) *Attorney, Agent, or Firm* — Marshall, Gerstein & Borun LLP; Randall G. Rueth (57) ABSTRACT

A tethering system for a remote-controlled device includes a tether line having a first end adapted to be connected to a ground support and a second end adapted to be connected to the remote-controlled device. The system further includes an anchor-point disposed between the first and second ends of the tether line, the anchor point having an eyelet for securing the tether line and allowing the tether line to slide through the eyelet during use. The anchor-point and eyelet enable the tether line to flex or bend and the remote-controlled device to maneuver one or more of over or around the target area without interfering with any nearby obstructions.

7 Claims, 6 Drawing Sheets

TETHERING SYSTEM AND METHOD FOR REMOTE DEVICE

FIELD OF THE DISCLOSURE

This disclosure relates to remote-controlled devices, and in particular, to a tethering system and method for remote-controlled devices.

BACKGROUND OF THE DISCLOSURE

After an accident or loss, property owners typically file claims with their insurance companies. In response to these claims, insurance agents or representatives investigate the claims to determine the extent of damage and/or loss, ultimately providing their clients with appropriate compensation.

Often, the claim investigations can be time-consuming, difficult and even dangerous for the insurance agents or representatives. For example, to investigate a claim for damage to a homeowner's roof, an insurance representative may have to climb onto the roof and perform inspections while on the roof. When climbing on the roof and attempting to maneuver around the roof for the inspection, the insurance representative runs a risk of injury, especially in difficult weather conditions, where the roof may be slippery because of rain, snow, and/or ice and winds may be severe.

Even if the insurance representative inspects without getting injured, performing the investigation may still be time-consuming. For example, in situations where the insurance company has received a large number of claims in a short time period, e.g., when a town is affected by a hurricane, tornado, or other natural disaster, the representative may not have time to perform timely claim investigations of all the received claims. If claim investigations are not performed quickly, property owners may not receive recovery for their losses for long periods of time. Additionally, long time delays when performing claim investigations can lead to inaccurate investigation results, e.g., the delay may lead to increased opportunity for fraud and/or may make it more difficult to ascertain the extent of damage at the time of the accident or loss.

To address such issues, insurance representatives are increasingly using remote-controlled devices to survey, film and/or take pictures of damaged property, such as on a roof or other difficult to inspect area, without having to walk onto the roof or other area. However, current Federal Aviation Administration (FAA) regulations may limit and/or prevent the use of such devices in the air for commercial purposes. More specifically, while remote devices have limited range and altitude, there is a small potential for interference with national airspace and potential mid-air collisions during operation, especially if the remote devices are operating around or near an airport. As a result, tethers are being used with commercially used remote-controlled devices to avoid conflicts with current FAA regulations.

Controlling such tethered devices, however, presents its own set of problems. For example, tree limbs, electrical wires, and other obstacles are often between the target area where the device is needed, such as a roof, and the origin of a tether line. This is a particular challenge when the tethered device is operating on or above a house or other building where the line can get caught in tree limbs and electrical wires.

Untethered devices have a different challenge. While untethered devices can avoid tree limbs and other obstacles that may interfere with a tether line, without a physical tether line, untethered devices run the risk of straying onto a neighbor's property or worse, such as into some irretrievable location like a river or wooded area.

SUMMARY OF THE DISCLOSURE

The present disclosure is directed to a tethering system for a remote-controlled device comprising a tether line having a first end adapted to be connected to a ground support and a second end adapted to be secured to the remote-controlled device. The system further comprises an anchor-point disposed between the first and second ends of the tether line, the anchor-point having an eyelet for securing the tether line and allowing the tether line to slide through the eyelet, wherein the anchor-point and the eyelet enable the tether line to flex or bend and the remote-controlled device to maneuver one or more of over or on a target area without interfering with any nearby objects.

In addition, the anchor-point may comprise one of a tripod or a weighted disc. The tripod may comprise a telescoping, extendible stand having a top portion and a bottom portion with at least two feet for supporting the stand, and the eyelet is disposed on the top portion of the stand.

Further, the eyelet may be disposed on the weighted disc and the weighted disc may be locked to the tether line when the weighted disc is carried to a location adjacent to the target area by the remote-controlled device.

Also, the weighted disc may be in a vertical position when locked to the tether line and in a horizontal position upon contact with the location adjacent to the target area.

Further, upon contact with the location adjacent to the target area, the remote-controlled device may release the weighted disc to the location adjacent to the target area, allowing the tether line to slide through the eyelet disposed on the weighted disc.

Still further, the first end of the tether line may include a swivel leader clip mechanism that allows easy clip-on or clip-off to the remote-controlled device.

Yet still further, the target area may be a portion of a roof.

In addition, the second end of the tether line may include a sleeved boom or sheath for extending the tether line in a semi-rigid manner away from one or more of any of extensions, rotors or other interfering parts of the remote-controlled device or appurtenances, including one or more of sky lights, aerators, solar panels or chimneys, on the target area.

Further, the remote-controlled device may include one of a quadrocopter, a robot, a crawler or other sensory delivery mechanism.

Still further, the tethering system may comprise a docking station disposed adjacent to the ground support, and the docking station may have a homing beacon or pattern for attracting or aligning the remote-controlled device for landing.

In another example of the present disclosure, a method of tethering a remote-controlled device to a target area comprises positioning a tripod on a surface and away from obstacles blocking a view of the target area, attaching a first end of a tether line to a ground support, attaching the second end of the tether line to the remote-controlled device and forming an anchor-point via an eyelet of the tripod. This enables the tether line to flex or bend and the remote-controlled device to maneuver one or more of over or around the target area without interfering with any nearby objects.

In yet another example of the present disclosure, a method of tethering a remote-controlled device comprises attaching a first end of a tether line to a ground support and removeably attaching a weighted disc having an eyelet to the remote-controlled device. The method further comprises inserting the second end of the tether line through the eyelet of the weighted disc, attaching a second end of the tether line to the remote-controlled device, and carrying the weighted disc to a portion of the roof via the remote-controlled device. The method further comprises releasing the weighted disc to the portion of the roof to anchor the tether line and moving the remote-controlled device over to a target area, forming an anchor-point via the eyelet of the weighted disc. This enables the tether line to flex or bend and the remote-controlled device to maneuver one or more of over or around the target area without interfering with any nearby objects.

In yet another example of the present disclosure, a method of virtually tethering a remote-controlled device comprises equipping the remote-controlled device with an asset tracking device having a GPS receiver, the asset tracking device having a processor and a memory. The method further comprises defining a GPS boundary around a target area via the asset tracking device and storing the GPS boundary in the memory. The method also comprises storing a module in the memory of the asset tracking device, the module executable by the processor to detect the position of the remote-controlled device via the GPS receiver, determine whether the remote-controlled device is within the GPS boundary via the asset tracking device, and automatically return the remote-controlled device to a start position upon determining the remote-controlled device exceeds or bypasses the GPS boundary.

DETAILED DESCRIPTION OF THE DISCLOSURE

Generally, a tethering system and method for a remote-controlled device is disclosed. The tethering system includes a tether line having a first end adapted to be connected to a ground support and a second end adapted to be secured to the remote-controlled device. An anchor-point is disposed between the first and second ends of the tether line and includes an eyelet for securing the tether line and allowing the tether line to slide through the eyelet during use. The anchor-point may include a telescoping, extendible tripod or a weighted disc, as explained in more detail below. Both anchor-points, e.g., the tripod and the weighted disc, enable the tether line to bend or flex and the remote-controlled device to maneuver over or on a target area without interfering with any nearby objects.

Figure 1:
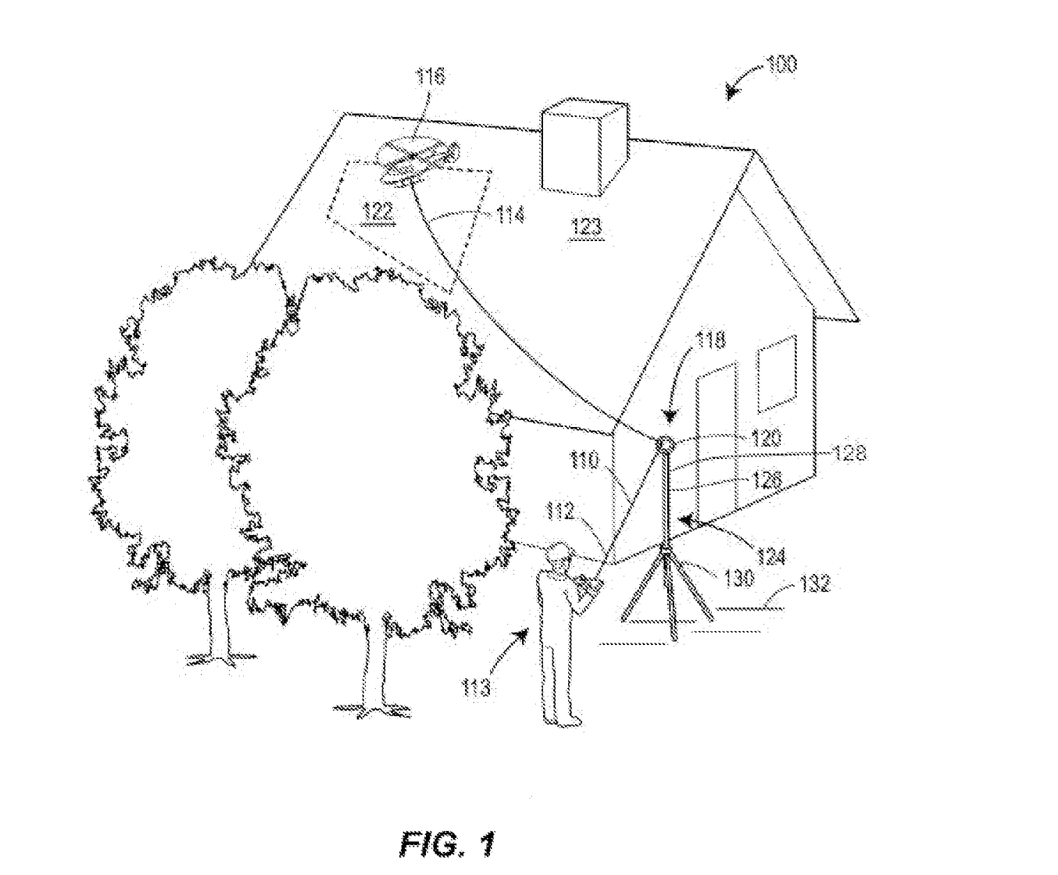
FIG. 1 is a perspective view of one example of a tethering system of the present disclosure.

Referring now to FIG. 1, an example tethering system 100 of the present disclosure is illustrated. The tethering system 100 includes a tether line 110 having a first end 112 or start point connected to a ground support 113. The ground support 113 may include a winch mechanism (not shown) or a person holding a spool of tether line, as illustrated in FIG. 1, but is not limited to those examples only. Various other structures, mechanisms or devices may alternatively be used to secure the first end 112 or start point of the tether line to the ground support 113. The tether line 110 further includes a second end 114 that is secured or connected to a remote-controlled device 116.

An anchor-point 118 is disposed between the first end 112 of the tether line 110 and the second end 114 of the tether line 110. The anchor-point 118 receives the tether line 110 and routes the tether line 110 away from any interfering objects, for example, such as large or overgrown trees and tree limbs, as illustrated in FIG. 1. More specifically, the anchor-point 118 further includes an eyelet 120 through which the second end 114 of the tether line 110 is inserted into before being secured to the remote-controlled device 116. The eyelet 120, thus, both secures the tether line 110 to the anchor-point 118 and allows the tether line 110 to move freely therethrough. This enables the remote-controlled device 116 that is attached to the second end 114 of the tether line 110 to freely maneuver over or on a designated target area 122, such as a portion of a roof 123, as illustrated in FIG. 1.

In one example, and as further illustrated in FIG. 1, the anchor-point 118 is a tripod 124. The tripod 124 includes a telescoping, extendible stand 126 having a top portion 128 and a bottom portion 130 and is between about 8 to 10 feet in height, in one example. The bottom portion 130 includes at least two feet for supporting the stand 126 and the top portion 128, for example. The eyelet 120 is disposed on the top portion 128 of the tripod 124. The tripod 124 and eyelet 120 through which the tether line 110 is disposed allow the tether line 110 to flex or bend around any nearby obstacles, rather than tail straight from the ground support 113 to the remote-controlled device 116 at the second end 114 of the tether line 110.

To effectively set up and operate the tethering system 100, the tripod 124 is positioned on a surface 132, such as a ground surface, away from any obstacles blocking a straight-line or other view of the target area 122. The first end 112 of the tether line 110 is attached or secured to the ground support 113. The second end 114 of the tether line 110 is then inserted into the eyelet 120 of the tripod 124 to secure the tether line 110 to the tripod 124. The tether line 110 is also able to slide through the eyelet 120, as explained above. The second end 114 of the tether line 110 is then secured to the remote-controlled device 116, and the anchor-point 118 is formed via the eyelet 120 of the tripod 124 disposed between the first and second ends 112, 114 of the tether line 110. Thus, when a user operates the remote-controlled device 116, such that it is directed to the target area 122, as illustrated in FIG. 1, the tripod 124 and the eyelet 120 disposed thereon routes the tether line 110 away from any interfering objects.

Figure 2A:
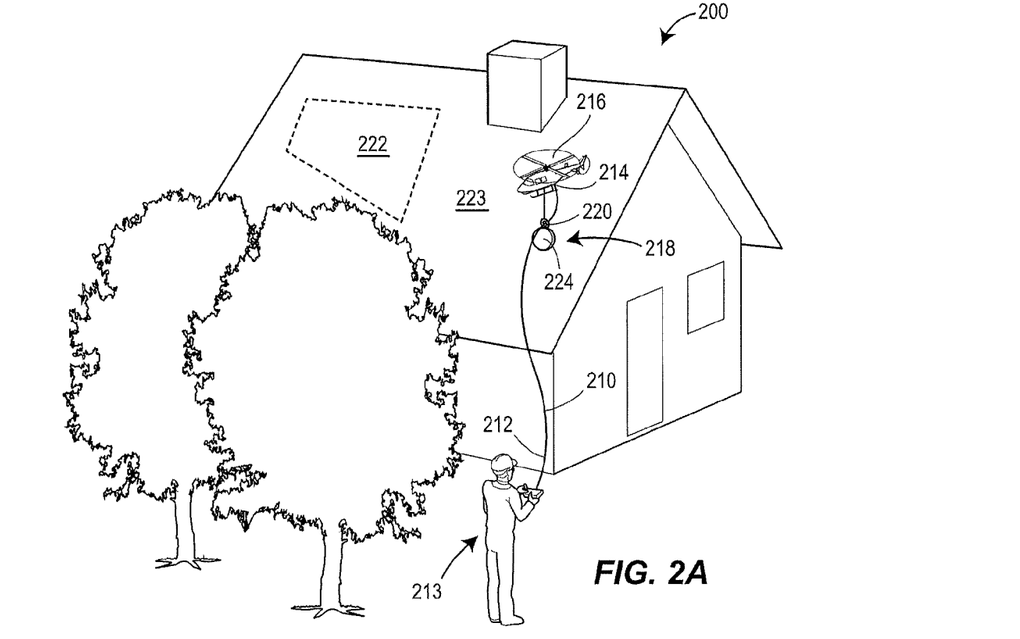
FIG. 2A is a perspective view of another example of a tethering system of the present disclosure.
Figure 2B:
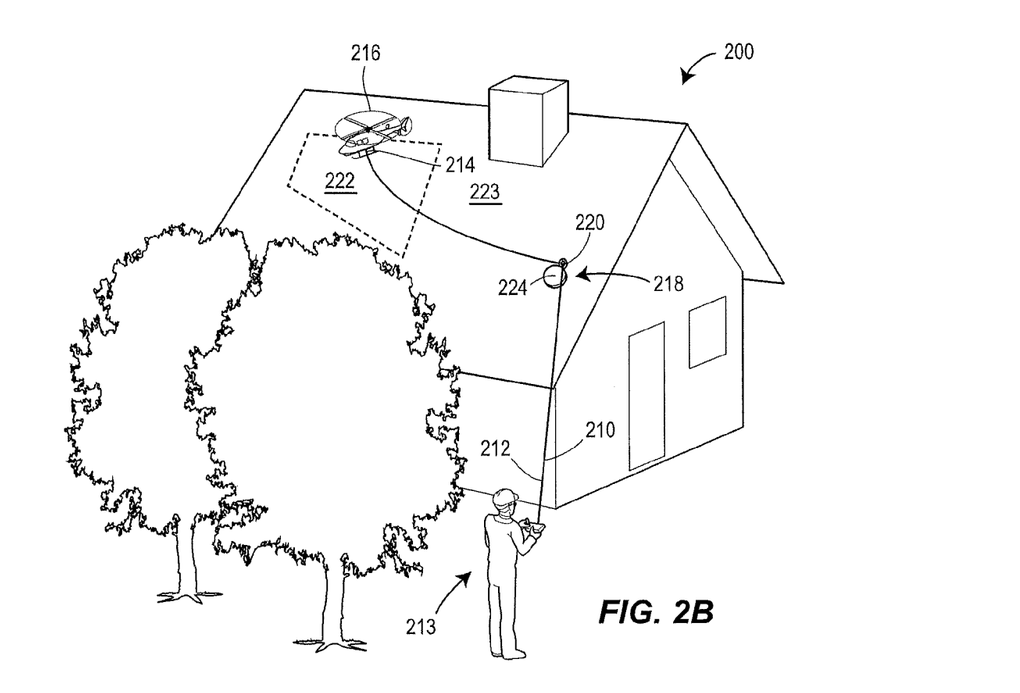
FIG. 2B is another perspective view of the tethering system of FIG. 2A.

Referring now to FIGS. 2A and 2B, another example tethering system 200 of the present disclosure is illustrated. Where the tethering system 200 of FIGS. 2A and 2B includes elements that correspond to the elements of the tethering system of FIG. 1, those elements will be numbered similarly, the only difference being that the reference numerals of FIGS. 2A, 2B are increased by a multiple of 100. For example, corresponding elements of FIG. 2A, 2B will be numbered exactly 100 greater than the corresponding elements illustrated in FIG. 1.

More specifically, like the tethering system 100 illustrated in FIG. 1, the tethering system 200 of FIGS. 2A and 2B also includes a tether line 210 having a first end 212 adapted to be connected to a ground support 213. The ground support 213 may include a winch mechanism (not shown) or a person holding a spool of tether line, as illustrated in FIG. 2, but is also not limited to those examples only. Various other structures, mechanisms or devices may alternatively be used to secure the first end 212 or start point of the tether line to the ground support 213. The tether line 210 further includes a second end 214 that is secured or connected to a remote-controlled device 216.

As illustrated in FIG. 2B, an anchor point 218 is disposed between the first end 212 of the tether line 210 and the second end 214 of the tether line 210. Like the anchor-point 118 of FIG. 1, the anchor-point 218 includes an eyelet 220 that receives the tether line 210, routing the tether line 210 away from any interfering objects, for example, such as large or overgrown trees and tree limbs, as illustrated in FIGS. 2A and 2B.

In the example tethering system 200 of FIGS. 2A and 2B, however, the anchor-point 218 is a weighted disc 224. The weighted disc 224 or frisbee-like anchor includes the eyelet 220 and forms a lock for locking the weighted disc 224 to the tether line 210 when the weighted disc 224 is being carried to a location on the roof 223 adjacent to a target area 222 by the remote-controlled device 216, as illustrated in FIG. 2A. More specifically, the weighted disc 224 is first removeably secured to the remote-controlled device 216. The second end 214 of the tether line 210 is then inserted into the eyelet 220 of the weighted disc 224 and then secured to the remote-controlled device 216. The remote-controlled device 216 carries the weighted disc 224 to the location adjacent to the target area 222, such as a portion of the roof 223. While the weighted disc 224 is being carried to the target area 222, the disc 224 tilts or moves to a vertical position and clinches the tether line 210, locking the weighted disc 224 to the tether line 210, as also illustrated in FIG. 2A.

Once the remote-controlled device 216 reaches the desired location on the roof 223, the remote-controlled device 216 lowers and releases the weighted disc 224 to the desired location on the portion of the roof 223. Upon contact with the portion of the roof 223, the orientation of the weighted disc 224 changes from a vertical position to a horizontal position, which simultaneously releases the tether line 210 from the locked, i.e., vertical position. A bottom surface of the weighted disc 224 includes a non-slide surface, which helps anchor the weighted disc 224 firmly to the desired location on the roof 223. The non-slide surface may include, but is not limited to, a rubber or semi-plastic material, similar to soles of a roofer's shoes, for example. The horizontal, unlocked position allows the tether line 210 to slide through the eyelet 220 of the weighted disc 224.

In other words, lowering and releasing the weighted disc 224 to the desired location on the roof 223 anchors the tether line 210 between the first and second ends 212, 214 of the tether line 210, forming the anchor-point 218 via the eyelet 220 of the weighted disc 224, as illustrated in FIG. 2B. Together the weighted disc 224 and the eyelet 220 enable the tether line 210 to bend or flex and slip through the eyelet 220 when the remote-controlled device moves over to the target area 222, without interfering with nearby objects.

To return the weighted disc 224 to the ground, the tether line 210 needs to be returned to the locked or vertical position from the ground. This may be accomplished, for example, through manual gripping of the tether line 210 or locking a winch or spool of a line (not shown), which allows the tethered remote-controlled device 216 to lift the weighted disc 224 from the roof 223. This movement away from the roof 223 causes the weighted disc 224 to move back to the vertical position from the horizontal position, locking the weighted disc 224 to the tether line 210 again and temporarily preventing movement of the tether line 210.

In each of the example tethering systems 100, 200 of FIGS. 1, 2A and 2B the second ends 114, 214 of the tether lines 110, 210, respectively, may be connected to a swivel leader clip mechanism or similar device. This mechanism or similar device allows easy clip-on or clip-off of the tether line 110, 210 to the remote-controlled devices 116, 216, as is well known to those of ordinary skill in the art. In addition, the tether lines 110, 210 may include a thin metal line or one or more of a power line or a data communications line, depending upon the remote-controlled device to which the tether lines 110, 210 are secured, for example.

Figure 3:
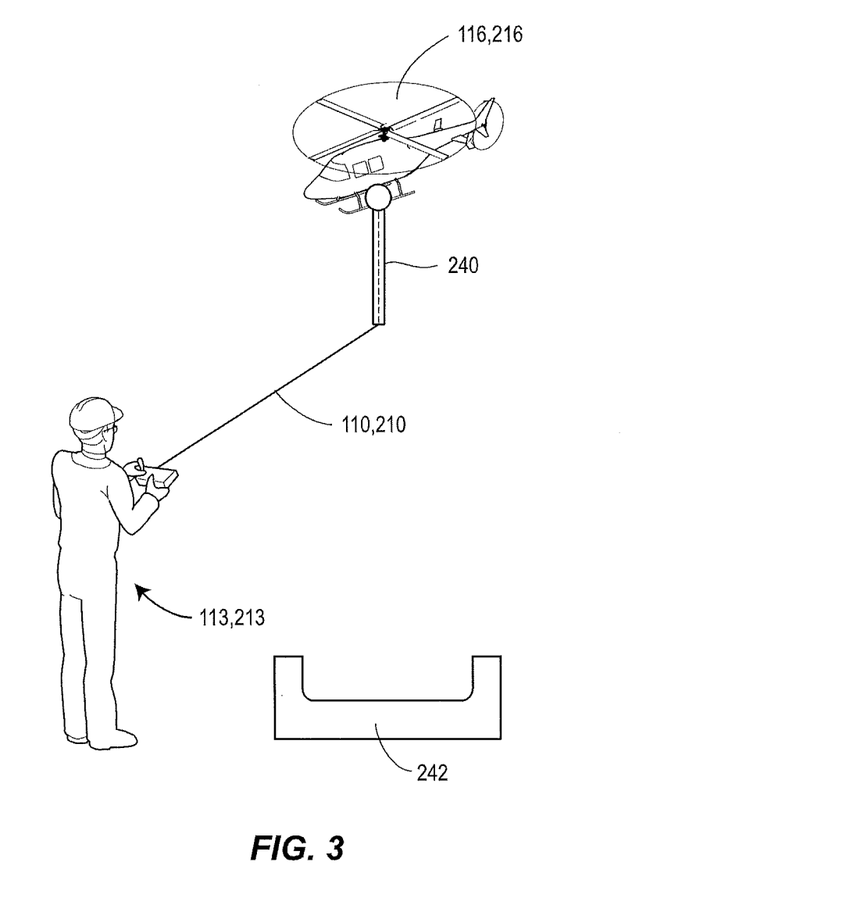
FIG. 3 is perspective view of a protective sheath and a docking station for use with one or both of the example tethering systems of FIGS. 1, 2A and 2B.

Referring now to FIG. 3, a sleeved boom or sheath 240 may be used with either of the example tethering systems 100, 200 of FIGS. 1 and 2A and 2B, respectively. In one example, the sleeved boom 240 is approximately ten inches long and is disposed immediately under the remote-controlled vehicles 116, 216, near the second ends 114, 214 of the tether lines 110, 210. For example, the sleeved boom 240 may be disposed two to three inches away from the second ends 114, 214 of the tether lines 110, 210, respectively. The sleeved boom 240 or sheath extends the tether lines 110, 210 in a semi-rigid manner away from one or more of any extensions, blades, rotors or other potentially interfering parts of the remote-controlled vehicles 116, 216, as illustrated in FIG. 3. In addition, the sleeved boom 240 also extends the tether lines 110, 210 away from any appurtenances on or near the target areas 122, 222 or roofs 123, 223, such as sky lights, aerators, solar panels and chimneys, for example.

As further depicted in FIG. 3, the tethering systems 100 and 200 may each further include a docking station 242 for receiving the remote-controlled device 116, 216. More specifically, the docking station 242 includes a homing beacon or pattern for attracting and/or aligning the remote-controlled device 116, 216 for landing after operation, for example. As such, in one example, as the tether line 110 or 210 is being retracted to bring the remote-controlled device 116, 216 to ground, the remote-controlled device 116, 216 via a sensor disposed on the remote-controlled device 116, 216, for example, is attracted to and/or aligned with the docking station 242 via the homing beacon for landing on the docking station 242.

Figure 4:
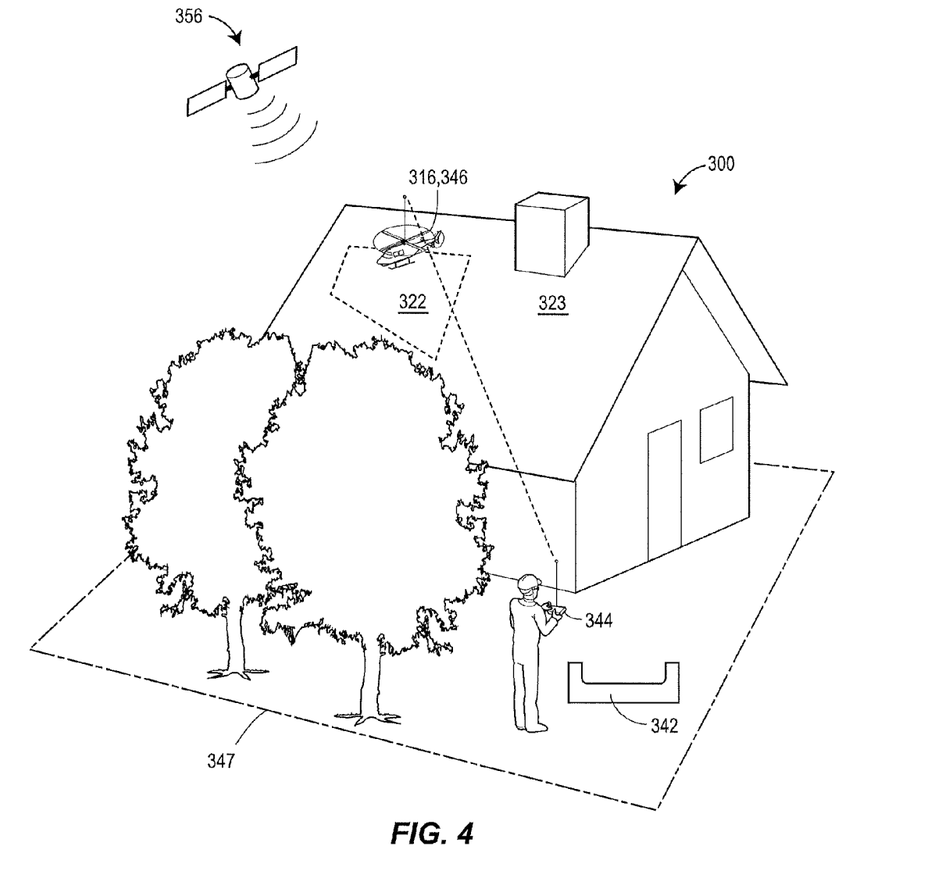
FIG. 4 is a perspective view of an example virtual tethering system of the present disclosure.

Referring now to FIG. 4, an example virtual tethering system 300 of the present disclosure is illustrated. The virtual tethering system 300 includes a remote-controlled device 316 that is communicatively coupled to a portable communication device 344, such as a remote control or similar device for operating and controlling the remote-controlled device 316. The remote-controlled device 316 and the portable communication device 344 may be communicably coupled to a network and one or more GPS satellites 356, as explained in more detail below. In the example virtual tethering system 300, one of the remote-controlled device 316 or the portable communications unit may include an asset tracking device 346 for determining the position of the remote-controlled device 316 during operation, for example. In the virtual tethering system 300 of FIG. 4, the asset tracking device 346 is included in the remote-controlled device 316.

Figure 5:
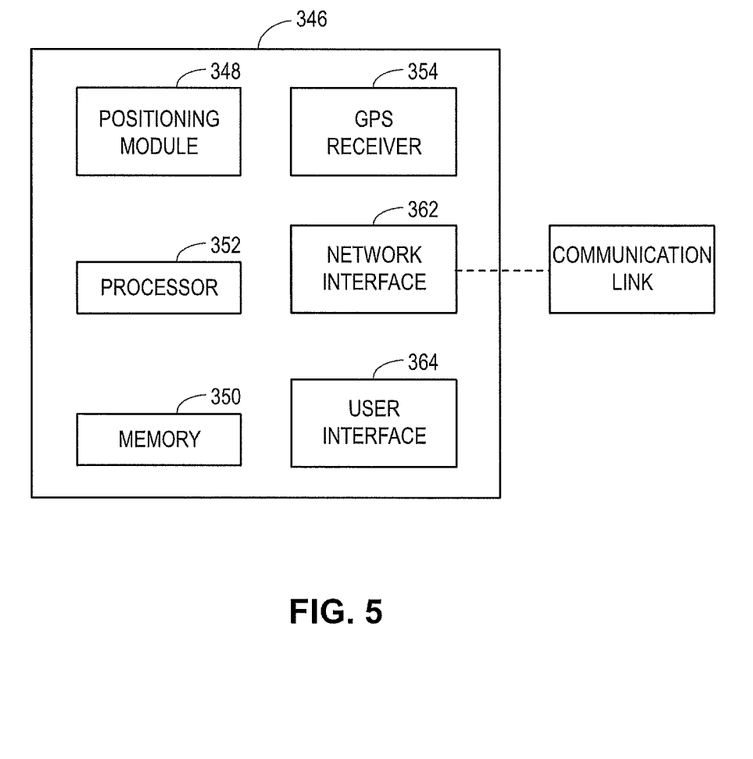
FIG. 5 is a block diagram of a portion of the virtual tethering system of FIG. 4.

More specifically, an example block diagram of one asset tracking device 346 is illustrated in FIG. 5. The asset tracking device 346 may include a positioning module 348 that is configured to receive positioning data corresponding to the asset tracking device 346 of the remote-controlled device 316 and determine a spatial position or location of the asset tracking device 346. In one example, at least a portion of the positioning module 348 may include computer-executable instructions stored on a memory 350 of the asset tracking device 346 and executable by a processor 352 of the asset tracking device 346. The positioning module 348 may be in communication with a GPS receiver 354 that receives one or more GPS signals originated by one or more GPS satellites 356 (FIG. 4) and also communicates indications of the GPS signals to the positioning module 348. The positioning module 348 may determine a spatial position, e.g., a geographical position or a position corresponding to a set of three-dimensional coordinates, of the asset tracking device 346 disposed within one of the remote-controlled device 316 or the portable communication device 344 based on the GPS signals by using triangulation, mapping, and/or other suitable techniques.

In some examples, the indication of the spatial position may include an indication of respective absolute position or location of the remote-controlled device 316 to be tracked. For example, the indication of the absolute spatial position may be a set of three-dimensional spatial coordinates (e.g., x, y, z coordinates; or longitude, latitude, and altitude coordinates). In some examples, the asset tracking device 346 may transmit indications of absolute spatial positions (and not relative spatial positions) to an asset tracking host, such as the portable communications unit 344, for example.

In another example, the asset tracking device 346 may represent the particular spatial indication received from the GPS receiver 354 as a relative location based on a known landmark, waypoint, or point of reference within the programmed virtual boundary 347. In other words, the relative location may be defined in terms of the known landmark, waypoint, or point of reference. The asset tracking device 346 of the remote-controlled device 316 may transmit an indication of the relative spatial position to the asset tracking host or portable communications device 344, for example.

A network interface 362 may also be included in the asset tracking device 346. The network interface 362 may be a wireless interface, a wired interface, or some combination of wired and wireless interfaces. In one example, as the asset tracking device 346 may be included in the remote-controlled device 316 that is communicably coupled to the network, the network interface 362 may, via the network, communicate messages to and from the remote-controlled device 316.

In yet other examples, the asset tracking device 346 may include a user interface 364. The user interface 364 may include, for example, an input device having a keypad or buttons, a touch screen, or some other suitable user input interface for receiving information from a user. The user interface 364 may include, for example, an output device such as a screen, a display, or some other suitable output user interface for presenting information. In an example, a user of the asset tracking device 346 may enter data or information via the user interface 364, including coordinates that correspond to a virtual boundary 347 (FIG. 4) surrounding the target area 322. In one example, this selectable range is 250 to 500 feet from a start point of the remote-controlled device 316, such as a docking station 342 (FIG. 4). As such, before operation of the virtual tethering system 300, a user may program or enter coordinate information via the user interface 364 that defines a border or boundary surrounding the target area 322.

Figure 6:
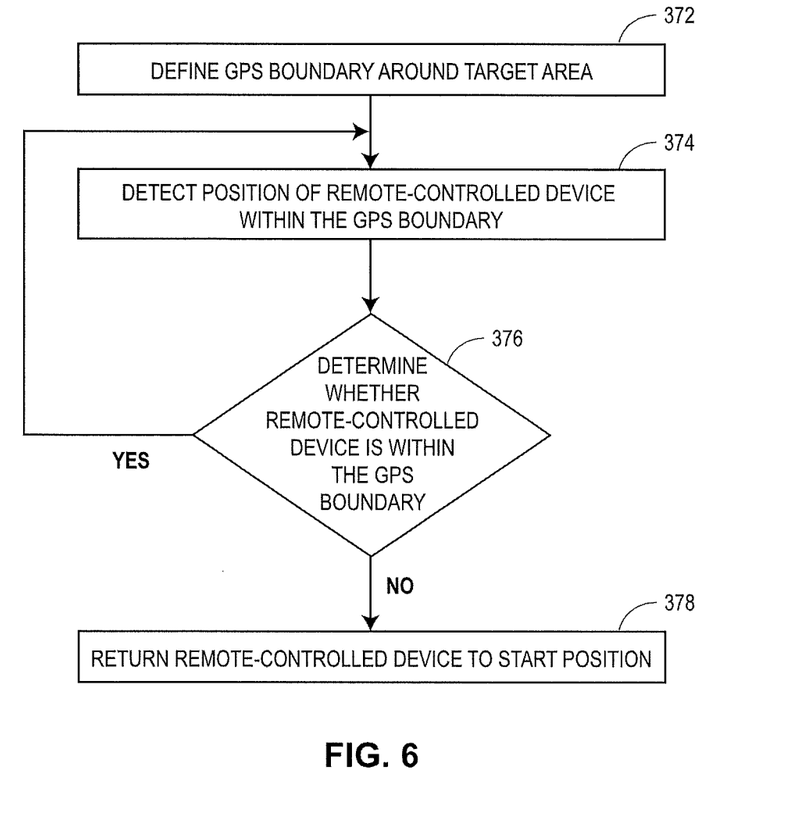
FIG. 6 is a routine or process flow diagram illustrating an exemplary method of virtually tethering a remote-controlled device that may be performed by the virtual tethering system of FIG. 4, for example.

FIG. 6 depicts an exemplary method 370 for virtually tethering the remote-controlled device 316. The method may be performed in conjunction with the asset tracking system 300 of FIG. 4, and/or with systems, devices, and apparatuses described therein.

More specifically, a virtual or GPS boundary 347 (FIG. 4) is defined around the target area 322 (block 372). In one example, a user of the remote-controlled device 316 having the asset tracking device 346 may enter data or information via the user interface 364 corresponding to a start point near the target area 322, such as the docking station 342. This may correspond to a "current location" feature of the portable communication unit 344 or the remote-controlled device 316 that a user selects or designates as the start point, for example. The user may then further enter data or information again via the user interface 346 corresponding to a range within a 250 to 500 feet radius from the start point of the remote-controlled device 316. Exact coordinates may be alternatively inputted, such as x, y, and z coordinates corresponding to longitude, latitude, and altitude coordinates, respectively, of the desired boundary lines.

The position of the remote-controlled device 316 is detected within the virtual or GPS boundary 347 via the GPS receiver 354 of the asset tracking device 346 disposed within the remote-controlled device 316, for example (block 374). In some examples, positioning data corresponding to or indicative of the asset tracking device 346 of the remote-controlled device 316 may be absolute data, such as GPS data, e.g., a set of three-dimensional coordinates x, y and z; or a latitude/longitude/altitude indication. In other examples of the method 370, a relative spatial location or position is determined based on the absolute data obtained. For example, the absolute positioning data may be translated into a relative spatial location based on the inputted virtual boundary coordinates or other known landmark, waypoint or point of reference.

The asset tracking device 346 of the remote-controlled device 316 determines whether the remote-controlled device 316 is within the inputted or programmed GPS boundary 347 (block 376). More specifically, the positioning data corresponding to the actual position of the asset tracking device 346 of the remote-controlled device 316 is compared to the data corresponding to the virtual GPS boundary 347 stored in the memory 350 of the asset tracking device 346, for example. If the actual position of the remote-controlled device 316 is within the virtual GPS boundary 347, the position of the remote-controlled device 316 continues to be detected by the GPS receiver 354 of the asset tracking device 346. If, however, the actual position of the remote-controlled device 316 bypasses or is outside of the virtual boundary 347, the remote-controlled device 316 automatically begins to descend to return to the start position within the GPS boundary 347, such as the docking station 342.

More specifically, the remote-controlled device 316 returns to the start position after determining the remote-controlled device 316 exceeded or surpassed the GPS boundary 347 (block 378). In other words, the remote-controlled device 316 is programmed to automatically return to the start or home position upon meeting coordinates corresponding to the GPS boundary 347, such as when a system or pilot error occurs. This prevents the remote-controlled device 316 from exceeding the GPS boundary 347 and effectively virtually tethers the remote-controlled device 316 within the GPS boundary 347.

In one example, an altimeter (not shown) and a watch-dog timer (not shown) may be used alone or in combination with each other and/or the virtual tethering system 300. More specifically, the altimeter cannot exceed a pre-programmed height or it returns to base or ground or a start point, if sensed. In addition, in another example, the watch-dog timer may go off and must be reset by an operator or the watch-dog timer returns to the base or the ground or the start point.

In another example, the signal strength of the remote-controlled device 316 may be used to sense or determine whether the remote-controlled device 316 has exceeded a defined or GPS boundary, for example. More specifically, when the detected strength of the signal of the remote-controlled device 316 is low, the system 300 may determine the remote-controlled device 316 exceeded or became too close to the GPS boundary and automatically return the remote-controlled device 316 to a start or home position. Likewise, when the detected strength of the signal of the remote-controlled device 316 is high, the system 300 may determine that the remote-controlled device 316 is properly operating within the defined GPS boundary, for example.

In yet another example, if there is a system error, such as a GPS signal is locked, optical flow characteristics of the remote-controlled device 316 may be used to sense such an error and detect the position of the remote-controlled device 316. More specifically, the camera attached to the remote-controlled device may compensate for failures of the asset tracking device 346 and prevent the remote-controlled device from exceeding the virtual boundary 346. The optical flow characteristics of the remote-controlled device 346 are recognized with the camera pointing down from the remote-controlled device 346, as the camera is able to see objects and how the remote-controlled device is moving. Such data is used to compensate for pilot error or navigation failure of the remote-controlled device 316.

Alternatively, instead of GPS signals and hardware, radio signals and associated hardware may be used to define a virtual boundary and detect the position of the remote-controlled device 316 within the boundary. More specifically, transmitters may be installed at four desired corners of a desired virtual boundary, forming a box in which the remote-controlled device or vehicle 316 operates. In addition, an RF receiver may be included within the remote-controlled device 316, such that the RF receiver detects the position of the remote-controlled device 316 via RF signals with the virtual boundary. The remote-controlled device 316 may then be returned to a home or start position within the virtual boundary upon detection of the position of the remote-controlled device 316 outside of the virtual boundary, for example.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain implementations are described herein as including logic or a number of components, modules, or mechanisms. Modules may constitute either software modules (e.g., code implemented on a tangible, non-transitory machine-readable medium such as RAM, ROM, flash memory of a computer, hard disk drive, optical disk drive, tape drive, etc.) or hardware modules (e.g., an integrated circuit, an application-specific integrated circuit (ASIC), a field programmable logic array (FPLA), etc.). A hardware module is tangible unit capable of performing certain operations and may be configured or arranged in a certain manner. In example implementations, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the implementations herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a tethering system and method for a remote-controlled device through the disclosed principles herein. Thus, while particular implementations and applications have been illustrated and described, it is to be understood that the disclosed implementations are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

While the preceding text sets forth a detailed description of numerous different embodiments of the invention, it should be understood that the legal scope of the invention is defined by the words of the claims set forth at the end of a patent claiming priority hereto. The detailed description is to be construed as exemplary only and does not describe every possible embodiment of the invention since describing every possible embodiment would be impractical, if not impossible. Numerous alternative embodiments or examples could be implemented, using either current technology developed after the filing date of this patent, which would still fall within the scope of the claims of the patent. More generally, although certain example systems and assemblies have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A tethering system for a remote-controlled device comprising:
 a tether line having a first end adapted to be connected to a ground support and a second end adapted to be secured to a remote-controlled device;
 an anchor-point disposed between the first and second ends of the tether line, the anchor-point having an eyelet for securing the tether line and allowing the tether line to slide through the eyelet, wherein the anchor-point comprises a tripod comprising a stand having a top portion and a bottom portion for supporting the stand, and the eyelet is disposed on the top portion of the stand; and
 a docking station disposed adjacent to the ground support;
 wherein the anchor-point and the eyelet enable the tether line to flex or bend and the remote-controlled device to maneuver one or more of over or on a target area without interfering with any nearby objects.

2. The tethering system of claim 1, wherein the target area is a portion of a roof.

3. The tethering system of claim 1, wherein the second end of the tether line includes a sleeved boom or sheath for extending the tether line in a semi-rigid manner away from one or more of any of extensions, rotors or other interfering parts of the remote-controlled device or appurtenances, including chimneys, on the target area.

4. A tethering system for a remote-controlled device comprising:
 a tether line having a first end adapted to be connected to a ground support and a second end adapted to be secured to a remote-controlled device;
 an anchor-point disposed between the first and second ends of the tether line, the anchor-point having an eyelet for securing the tether line and allowing the tether line to slide through the eyelet, wherein the anchor-point comprises a weighted disc that is locked to the tether line when the weighted disc is carried to a location adjacent to a target area by the remote-controlled device, and the weighted disc is in a vertical position when locked to the tether line and in a horizontal position upon contact with the location adjacent to the target area; and
 a docking station disposed adjacent to the ground support;
 wherein the anchor-point and the eyelet enable the tether line to flex or bend and the remote-controlled device to maneuver one or more of over or on the target area without interfering with any nearby objects.

5. The tethering system of claim 4, wherein, upon contact with the location adjacent to the target area, the remote-controlled device releases the weighted disc to the location adjacent to the target area, allowing the tether line to slide through the eyelet disposed on the weighted disc.

6. The tethering system of claim 4, wherein the target area is a portion of a roof.

7. The tethering system of claim 4, wherein the second end of the tether line includes a sleeved boom or sheath for extending the tether line in a semi-rigid manner away from one or more of any of extensions, rotors or other interfering parts of the remote-controlled device or appurtenances, including chimneys, on the target area.

* * * * *